United States Patent [19]

Suzuki et al.

[11] 4,250,278

[45] Feb. 10, 1981

[54] FLUORINATED RUBBER COMPOSITION

[75] Inventors: Takeshi Suzuki, Kyoto; Yasuyoshi Furukawa, Ikedaminami; Masayasu Tomoda, Shiga; Yutaka Ueta; Akira Ohmori, both of Osaka, all of Japan

[73] Assignee: Daikin Kogyo Co., Ltd., Osaka, Japan

[21] Appl. No.: 35,006

[22] Filed: May 1, 1979

[30] Foreign Application Priority Data

May 1, 1978 [JP] Japan ................................. 53/53120

[51] Int. Cl.$^3$ ............................ C08F 8/18; C08F 8/34
[52] U.S. Cl. ................................. 525/340; 260/42.27;
525/331; 525/341; 525/348; 525/351; 525/359
[58] Field of Search ..................... 260/42.27; 525/255,
525/256, 259, 359, 340, 341, 348, 351, 331

[56] References Cited

U.S. PATENT DOCUMENTS

| 3,655,727 | 4/1972 | Patel et al. | 260/42.27 |
| 3,872,065 | 3/1975 | Schmiegel | 260/42.27 |
| 3,931,129 | 1/1976 | Kometani et al. | 260/42.27 |
| 3,933,732 | 1/1976 | Schmiegel | 260/42.27 |
| 3,951,913 | 4/1976 | Kometani et al. | 260/42.27 |
| 4,141,874 | 2/1979 | Oka et al. | 526/255 |

*Primary Examiner*—William F. Hamrock
*Attorney, Agent, or Firm*—Birch, Stewart, Kolasch & Birch

[57] ABSTRACT

A vulcanizable fluorinated rubber composition comprising a fluorinated rubber containing —$CH_2$—$CF_2$— units in the polymeric chain, a vulcanizing agent and a vulcanization accelerator as the essential components, characterized in that the vulcanizing agent is a fluorine-containing polyhydroxy aliphatic compound.

12 Claims, No Drawings

FLUORINATED RUBBER COMPOSITION

The present invention relates to a fluorinated rubber composition. More particularly, it relates to a vulcanizable fluorinated rubber composition which can afford a vulcanized rubber having an excellent compression set and aging resistance.

As is well known, a fluorinated rubber such as an elastic copolymer of vinylidene fluoride with at least one other monomer can be vulcanized with a vulcanizing agent such as a diamine compound, an organic peroxide or a polyhydroxy aromatic compound to give a vulcanized fluorinated rubber which is excellent in thermal resistance, oil-resistance, solvent-resistance, chemical resistance, etc. Among various vulcanizing agents, a polyhydroxy aromatic compound, especially 2,2-bis(4-hydroxyphenyl)perfluoropropane (hereinafter referred to as "Bisphenol AF"), possesses an excellent vulcanizing activity and can afford a vulcanized fluorinated rubber having a high thermal resistance.

As the result of an extensive study, it has now been found that a fluorine-containing polyhydroxy aliphatic compound shows a vulcanizing effect comparable to bisphenol AF and can give a vulcanized fluorinated rubber, which is excellent in compression set and aging resistance. The present invention is based on this finding.

According to the present invention, there is provided a vulcanizable fluorinated rubber composition comprising a fluorinated rubber containing —CH$_2$—CF$_2$— units in the polymeric chain, a vulcanizing agent and a vulcanization accelerator as the essential components, which is characterized in that the vulcanizing agent is a fluorine-containing polyhydroxy aliphatic compound.

The fluorinated rubber usable in the composition of the invention is an elastic copolymer containing —CH$_2$—CF$_2$— units in the polymeric chain. Examples of such copolymers are copolymers of vinylidene fluoride (VdF) with one or more other copolymerizable fluorine-containing olefins such as hexafluoropropene (HFP), pentafluoropropene, trifluoroethylene, trifluorochloroethylene, tetrafluoroethylene (TFE), vinyl fluoride, perfluoromethyl vinyl ether, perfluoropropyl vinyl ether, etc. Particularly preferred are a binary copolymer of vinylidene fluoride-hexafluoropropene (VdF/HFP), a ternary copolymer of vinylidene fluoride-tetrafluoroethylene-hexafluoropropene (VdF/TEF/HFP), etc.

As the fluorine-containing polyhydroxy aliphatic compound to be used as the vulcanizing agent, there may be employed a fluorine-containing dihydroxy compound represented by the formula:

$$Rf(CH_2OH)_2 \quad (I)$$

wherein Rf is a polyfluoroalkylene or polyfluorochloroalkylene group having 1 to 24 carbon atoms. Particularly, a fluorine-containing dihydroxy compound represented by either one of the formulae:

$$(CF_2)_m(CF_2CH_2OH)_2 \quad (II)$$

and $$(CF_2)_n(CFHCF_2CH_2OH)_2 \quad (III)$$

wherein m is an integer of 1 to 22 and n is an integer of 1 to 20 is preferable. Specific examples are as follows: CF$_2$(CF$_2$CH$_2$OH)$_2$, CF$_2$(CFHCF$_2$CH$_2$OH)$_2$, (CF$_2$)$_3$(CF$_2$CH$_2$OH)$_2$, (CF$_2$)$_3$(CFHCF$_2$CH$_2$OH)$_2$, (CF$_2$)$_5$(CF$_2$CH$_2$OH)$_2$, (CF$_2$)$_5$(CFHCF$_2$CH$_2$OH)$_2$, etc.

As the vulcanization accelerator, there may be advantageously employed various organic nitrogen-containing and phosphorus-containing compounds as shown below:

(a) Compounds represented by either one of the formulae:

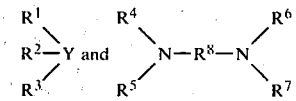

(wherein Y is N or P; R$^1$, R$^2$ and R$^3$ are each an alkyl group having 1 to 20 carbon atoms, or one of them may be a cycloalkyl group having 3 to 20 carbon atoms, or two of them may be linked together to form a nitrogen-containing ring; R$^4$, R$^5$, R$^6$ and R$^7$ are each an alkyl group having 1 to 6 carbon atoms, or two of them, i.e. R$^4$ and R$^6$ and/or R$^5$ and R$^7$ may be linked to form a ring; R$^8$ is an alkylene group having 1 to 21 carbon atoms), and their salts with organic or inorganic acids (in case of the salts, the symbol Y representing N);

(b) Compounds represented by either one of the formulae:

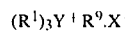

and

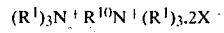

(wherein Y and R$^1$ are each as defined above, R$^9$ is an alkyl group having 1 to 20 carbon atoms or an aralkyl group having 7 to 20 carbon atoms, R$^{10}$ is an alkylene group having 1 to 21 carbon atoms or a phenylenedialkylene group having 8 to 12 carbon atoms and X is an anion such as a halide, hydroxylate, alkoxylate, carboxylate, phenoxide, sulfonate, sulfate, sulfite or carbonate);

(c) Compounds represented by the formula:

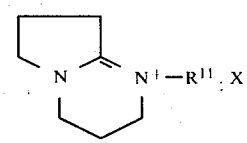

(wherein R$^{11}$ is an alkyl group having 1 to 24 carbon atoms or an aralkyl group having 7 to 20 carbon atoms and X is as defined above);

(d) Compounds represented by the formula:

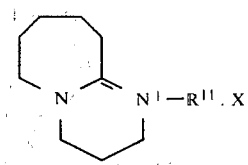

(wherein R$^{11}$ and X are each as defined above);

(e) Compounds represented by the formula:

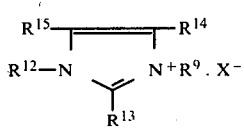

(wherein $R^{12}$ is an alkyl group having 1 to 20 carbon atoms, a cycloalkyl group having 3 to 20 carbon atoms or an aralkyl group having 7 to 20 carbon atoms, $R^{13}$ is a hydrogen atom, an alkyl group having 1 to 12 carbon atoms, a cycloalkyl group having 3 to 20 carbon atoms, an aryl group having 6 to 12 carbon atoms, an aralkyl group having 7 to 15 carbon atoms, an ether group having 1 to 12 carbon atoms, a hydroxyl group, a carbonyl group, an alkoxycarbonyl group, an acyl group or a heterocyclic group containing at least one nitrogen and/or sulfur atom(s), $R^{14}$ and $R^{15}$ are each a hydrogen atom or an alkyl group having 1 to 4 carbon atoms and $R^9$ and X are each as defined above);

(f) N-Containing polyether compounds represented by one of the formula:

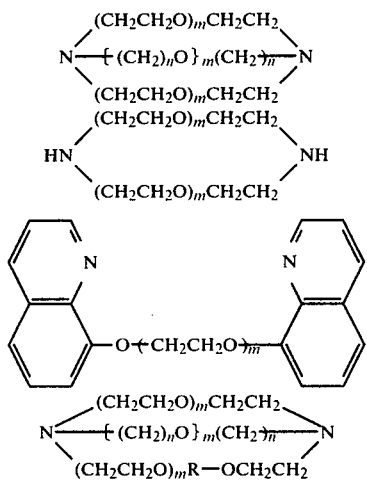

(wherein m and n are each an integer of 1 to 5 and R is a substituent such as

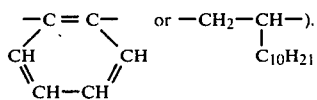

Typical examples of these compounds are described in detail in Japanese Patent Publication Nos. 19638/1973, 55230/1973, 55231/1973 and 32942/1974.

As the said salts of the compounds (a), there may be exemplified salts with inorganic acids such as hydrochloric acid, nitric acid, phosphoric acid and sulfuric acid, and salts with organic acids such as acetic acid, propionic acid, oxalic acid and phenols.

Among the above compounds, those in a solid form may be as such added to the fluorinated rubber, and those in a liquid form are preferably admixed with a suitable dispersing carrier (e.g. an adsorbing agent) and then incorporated into the fluorinated rubber.

The composition of the invention is usually composed of 100 parts by weight of the fluorinated rubber, 0.5 to 10 parts by weight (preferably 0.5 to 5 parts by weight) of the fluorine-containing polyhydroxy aliphatic acid as the vulcanizing agent and 0.1 to 10 parts by weight (preferably 0.3 to 2 parts by weight) of the vulcanization accelerator. When the amount of the fluorine-containing polyhydroxy aliphatic compound is smaller, the cross-linking degree is insufficient. When the amount is larger, the rubbery property tends to be lost.

In addition to these essential components, the composition of the invention may contain optionally other additives in appropriate amounts. Examples of such optional additives are oxides and hydroxides of divalent metals (e.g. Mg, Ca, Zn, Ba, Pb). The composition of the invention may also contain fillers such as carbon black, silica, clay, diatomaceous earth and talc, reinforcing agents, plasticizers, pigments, etc.

The composition of the invention may be prepared by kneading the essential components with or without the optional components by a conventional procedure, e.g. using a roll mill, to make a uniform mixture. Vulcanization of the composition may be also effected by a conventional procedure, for instance, by keeping the composition in a mold at a temperature of 120° to 200° C. under pressure for 5 to 30 minutes and then maintaining it in a furnace at a temperature of 200° to 260° C. for 16 to 24 hours.

The fluorinated rubber composition of the invention will be hereinafter explained further in detail in the following Examples and Comparative Examples.

EXAMPLES 1 TO 8

A VdF/HFP copolymer as the fluorinated rubber, a fluorine-containing polyhydroxy aliphatic compound: $(CF_2)_4(CFHCF_2CH_2OH)_2$ as the vulcanizing agent and 8-benzyl-1,8-diazabicyclo-[5,4,0]-7-undecenonium chloride, triphenylbenzylphosphonium chloride, dimethylmyristylbenzyl ammonium chloride, trimethylamine hydrochloride or "Kryptofix 222" (4,7,13,16,21,24-hexaoxa-1,10-diazabicyclo[8,8,8]hexacosane) as the vulcanization accelerator were mixed together and MT-carbon black, magnesium oxide (high activity) and calcium hydroxide as the additives were incorporated therein to make a uniform vulcanizable composition as shown in Table 1. The vulcanizable composition was vulcanized in a conventional procedure. With a specimen obtained from the vulcanized product, its physical properties were determined according to JIS (Japanese Industrial Standard) K-6301. The results are shown in Table 1.

COMPARATIVE EXAMPLES 1 TO 7

A vulcanizable fluorinated rubber composition was prepared in the same manner as in Examples 1 to 8 but using hydroquinone, bisphenol AF or hexamethylenediamine carbamate as the vulcanizing agent. The vulcanizable composition was vulcanized in a conventional procedure. With a specimen obtained from the vulcanized product, its physical properties were determined. The results are shown in Table 1.

From the results in Table 1, the following facts are understood:

1. The aging resistance of the vulcanized rubber obtained from the fluorinated rubber composition is improved much more notably in case of using the fluorine-containing polyhydroxy aliphatic compound as the vulcanizing agent in comparison with the case of using the fluorine-containing polyhydroxy aromatic compound.

2. When the fluorine-containing polyhydroxy aliphatic compound (particularly $HOCH_2CF_2CFH(CF_2)_4CFHCF_2CH_2OH$) is used as the vulcanizing agent, a fluorinated rubber composition of high quality showing a sufficient vulcanizing speed can be obtained even when the amount of calcium hydroxide usually employed as an additive (3–10 parts by weight to 100 parts by weight of the fluorinated rubber; standard amount to be added, 6 parts by weight) is reduced to 0.5 to 1 part by weight. Since calcium hydroxide in a free form affords undesirable influences on corrosion resistance, the decrease of its amount is desirable.

3. In vulcanization of the conventional fluorinated rubber composition, heating at about 170° C. is required, while in the composition of the invention comprising the fluorine-containing dihydroxyaliphatic compound of the formula: $(CF_2)_m(CF_2CH_2OH)_2$ or $(CF_2)_n(CFHCF_2CH_2OH)_2$ (wherein m and n are each an integer of 4 to 6), processing of molding is possible at a lower temperature of 130° to 150° C. within almost the same time. Thus, the composition of the invention is advantageous from the viewpoint of energy-saving.

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Fluorinated rubber composition | VDF/HFP copolymer | 100 | 100 | 100 | 100 | 100 | 100 | 100 | 100 | 100 | 100 |
| | MT-carbon black | 20 | 20 | 20 | 20 | 20 | 20 | 20 | 20 | 20 | 20 |
| | Highly active magnesium oxide | 3 | 3 | 3 | 3 | 3 | 3 | 3 | 3 | 3 | 3 |
| | Calcium hydroxide | 6 | 0 | 2 | 6 | 6 | 6 | 6 | 6 | 6 | 6 |
| | $(CF_2)_4(CFHCF_2CH_2OH)_2$ | 2 | 2.54 | 2.54 | 2.54 | 2.54 | 2.54 | 2.54 | 2.54 | 2.54 | 2.54 |
| | Trimethylamine hydrochloride | — | — | — | — | — | — | — | — | 0.8 | — |
| | Dimethylmyristylbenzyl ammonium chloride | — | — | — | — | — | — | — | 0.8 | — | — |
| | 8-Benzyl-1,8-diazabicyclo-[5,4,0]-7-undecenium chloride | 0.35 | 0.35 | 0.35 | 0.35 | 0.35 | 0.35 | — | — | — | — |
| | Triphenyl benzyl phosphonium chloride | — | — | — | — | — | — | — | — | — | 0.45 |
| | Kryptofix 222 | — | — | — | — | — | — | 0.50 | — | — | — |
| | Hexamethylenediamine carbamate | — | — | — | — | — | — | — | — | — | — |
| | Polyhydroxy- Hydroquinone aromatic compound  Bisphenol A | — | — | — | — | — | — | — | — | — | — |
| Vulcanization (Curastometer: JSR-II type; chamber No. 1; vibration, 6 cpm; amplitude, ±3°) | Temperature of determination (°C.) | 170 | 170 | 170 | 170 | 150 | 130 | 170 | 170 | 170 | 170 |
| | Minimum viscosity (kg) | 0.32 | 0.23 | 0.31 | 0.45 | 0.53 | 0.65 | 0.40 | 0.35 | 0.39 | 0.32 |
| | Vulcanization degree (kg) | 2.15 | 1.55 | 1.68 | 2.64 | 2.70 | 2.33 | 2.15 | 2.81 | 1.81 | 3.05 |
| | Induction time (min) | 0.4 | 7.8 | 1.2 | 0.4 | 0.70 | 1.4 | 0.6 | 6.8 | 1.5 | 0.4 |
| | Proper vulcanization time (min) | 8.0 | 19.0 | 7.0 | 10.0 | 9.7 | 9.4 | 14.6 | 12.0 | 16.5 | 8.4 |
| | Vulcanization speed (min) | 7.6 | 11.2 | 5.8 | 9.6 | 9.0 | 8.0 | 14.0 | 5.2 | 15.0 | 8.0 |
| Normal state | 100% tension (kg/cm$^2$) | 33 | — | — | 47 | — | 45 | 55 | 51 | 65 | 48 |
| | Tensile strength (kg/cm$^2$) | 156 | — | — | 154 | — | 155 | 134 | 142 | 130 | 155 |
| | Elongation (%) | 280 | — | — | 240 | — | 250 | 180 | 190 | 160 | 260 |
| | Hardness (JIS, Hs) | 70 | — | — | 71 | — | 70 | 74 | 73 | 72 | 72 |
| Aging (after 275° C. × 70 hrs.) | Change in tensile strength (%) | −29 | — | — | −20 | — | −19 | −19 | −21 | −22 | −19 |
| | Change in elongation (%) | +11 | — | — | +10 | — | +11 | +5 | +12 | +15 | +18 |
| | Change in hardness (ΔHs) | +2 | — | — | +2 | — | +2 | +3 | +2 | +3 | +3 |

| | | | Comparative Example | | | | | | |
|---|---|---|---|---|---|---|---|---|---|
| | | | 1 | 2 | 3 | 4 | 5 | 6 | 7 |
| | Fluorinated rubber composition | VDF/HFP copolymer | 100 | 100 | 100 | 100 | 100 | 100 | 100 |
| | | MT-carbon black | 20 | 20 | 20 | 20 | 20 | 20 | 20 |
| | | Highly active magnesium oxide | 3 | 3 | 3 | 3 | 3 | 3 | 15 (low active) |
| | | Calcium hydroxide | 6 | 6 | 6 | 6 | 0 | 6 | — |
| | | $(CF_2)_4(CFHCF_2CH_2OH)_2$ | — | — | — | — | — | — | — |
| | | Trimethylamine hydrochloride | 0.8 | — | — | — | — | — | — |
| | | Dimethylmyristylbenzyl ammonium chloride | — | 0.8 | — | — | — | — | — |
| | | 8-Benzyl-1,8-diazabicyclo-[5,4,0]-7-undecenium chloride | — | — | 0.35 | 0.35 | 0.35 | — | — |
| | | Triphenyl benzyl phosphonium chloride | — | — | — | — | — | 0.45 | — |
| | | Kryptofix 222 | — | — | — | — | — | — | — |
| | | Hexamethylenediamine carbamate | — | — | — | — | — | — | 1.5 |
| | | Polyhydroxy- Hydroquinone aromatic | 1.0 | — | — | — | — | — | — |

TABLE 1-continued

| | | | | | | | | |
|---|---|---|---|---|---|---|---|---|
| | compound Bisphenol A | — | 2.0 | 1.6 | 2.0 | 2.0 | 1.0 | — |
| Vulcanization (Curastometer: JSR-II type; chamber No. 1; vibration, 6 cpm; amplitude, ±3°) | Temperature of determination (°C.) | 170 | 170 | 170 | 170 | 170 | 170 | 170 |
| | Minimum viscosity (kg) | 0.67 | 0.38 | 0.51 | 0.43 | Not hardened for 20 min's vulcanization | 0.35 | 0.49 |
| | Vulcanization degree (kg) | 2.10 | 3.15 | 3.57 | 4.12 | | 3.75 | 4.01 |
| | Induction time (min) | 2.0 | 6.9 | 2.9 | 4.9 | | 4.5 | 1.7 |
| | Proper vulcanization time (min) | 12.0 | 13.0 | 4.4 | 7.4 | | 6.5 | 14.6 |
| | Vulcanization speed (min) | 10.0 | 6.1 | 5.5 | 2.5 | | 2.0 | 12.9 |
| Normal state | 100% tension (kg/cm²) | 65 | 52 | 45 | 50 | — | 48 | 43 |
| | Tensile strength (kg/cm²) | 130 | 143 | 162 | 145 | — | 151 | 148 |
| | Elongation (%) | 140 | 180 | 230 | 200 | — | 220 | 210 |
| | Hardness (JIS, Hs) | 73 | 73 | 71 | 72 | — | 71 | 75 |
| Aging (after 275° C. × 70 hrs.) | Change in tensile strength (%) | −30 | −31 | −37 | −30 | — | −31 | −30 |
| | Change in elongation (%) | +5 | +15 | +18 | +15 | — | +11 | −15 |
| | Change in hardness (ΔHs) | +3 | +4 | +3 | +3 | — | +2 | +4 |

What is claimed is:

1. A vulcanizable fluorinated rubber composition comprising a fluorinated rubber containing —CH$_2$—CF$_2$— units in the polymeric chain, a vulcanizing agent and a vulcanizing accelerator as the essential components, said vulcanizing agent being a fluorine-containing polyhydroxy aliphatic compound having the formula:

Rf(CH$_2$OH)$_2$ in which Rf is a polyfluoroalkylene or polyfluorochloroalkylene group having 1 to 24 carbon atoms, said vulcanizing accelerator being an organic nitrogen-containing or phosphorus-containing compound.

2. The fluorinated rubber composition according to claim 1, wherein said vulcanizing agent is a fluorine-containing polyhydroxy aliphatic compound having the formula:

(CF$_2$)$_m$(CF$_2$CH$_2$OH)$_2$ or (CF$_2$)$_n$(CFHCF$_2$CH$_2$OH)$_2$ in which m is an integer of 1 to 22 and n is an integer of 1 to 20.

3. The fluorinated rubber composition according to claim 1, wherein the vulcanization accelerator is an organic nitrogen-containing compound.

4. The fluorinated rubber composition according to claim 4, wherein the organic nitrogen-containing compound is at least one member selected from the group consisting of (a) compounds represented by either one of the formulae:

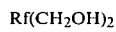

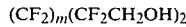

wherein Y is N; R$^1$, R$^2$ and R$^3$ are each an alkyl group having 1 to 20 carbon atoms, or one of said R$^1$, R$^2$ and R$^3$ may be a cycloalkyl group having 3 to 20 carbon atoms, or two of said R$^1$, R$^2$ and R$^3$ may be linked together to form a nitrogen-containing ring; R$^4$, R$^5$, R$^6$ and R$^7$ are each an alkyl group having 1 to 6 carbon atoms, or R$^4$ and R$^6$ and/or R$^5$ and R$^7$ may be linked to form a ring; and R$^8$ is an alkylene group having 1 to 21 carbon atoms, and salts thereof with organic or inorganic acids; (b) compounds represented by either one of the formulae:

(R$^1$)$_3$Y$^+$R$^9$.X$^-$ or (R$^1$)$_3$N$^+$R$^{10}$N$^+$(R$^1$)$_3$.2X$^-$ wherein Y and R$^1$ are each as defined above, R$^9$ is an alkyl group having 1 to 20 carbon atoms or an aralkyl group having 7 to 20 carbon atoms, R$^{10}$ is an alkylene group having 1 to 21 carbon atoms or a phenylene-dialkylene group having 8 to 12 carbon atoms and X is a halide, hydroxylate, alkoxylate, carboxylate, phenoxide, sulfonate, sulfate, sulfite or carbonate anion; (c) compounds represented by the formula:

wherein R$^{11}$ is an alkyl group having 1 to 24 carbon atoms or an aralkyl group having 7 to 20 carbon atoms and X is as defined above; (d) compounds represented by the formula:

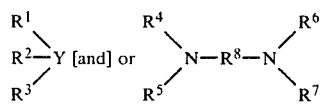

wherein R$^{11}$ and X are each as defined above; (e) compounds represented by the formula:

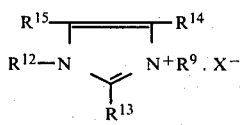

wherein $R^{12}$ is an alkyl group having 1 to 20 carbon atoms, a cycloalkyl group having 3 to 20 carbon atoms or an aralkyl group having 7 to 20 carbon atoms, $R^{13}$ is a hydrogen atom, an alkyl group having 1 to 12 carbon atoms, a cycloalkyl group having 3 to 20 carbon atoms, an aryl group having 6 to 12 carbon atoms, an aralkyl group having 7 to 15 carbon atoms, an ether group having 1 to 12 carbon atoms, a hydroxyl group, a carbonyl group, an alkoxycarbonyl group, an acyl group or a heterocyclic group containing at least one nitrogen and/or sulfur atom(s), $R^{14}$ and $R^{15}$ are each a hydrogen atom or an alkyl group having 1 to 4 carbon atoms and $R^9$ and X are each as defined above; and (f) N-containing polyether compounds represented by one of the formulae:

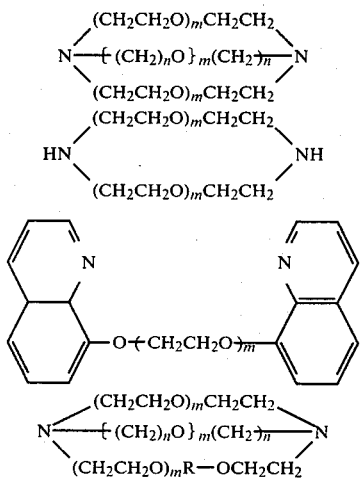

wherein m and n are each an integer of 1 to 5 and R is a substituent having the formula:

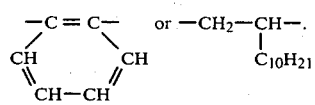

5. The fluorinated rubber composition according to claim 1, wherein the fluorinated rubber is a copolymer of vinylidene fluoride and hexafluoropropene, the vulcanizing agent is $(CF_2)_4\text{-}(CFHCF_2CH_2OH)_2$, and the vulcanization accelerator is 8-benzyl-1,8-diazabicyclo-[5,4,0]-7-undecenonium chloride.

6. The fluorinated rubber composition according to claim 3, wherein the vulcanization accelerator is 8-benzyl-1,8-diazabicyclo-[5,4,0]-7-undecenonium chloride.

7. The fluorinated rubber composition according to claim 4, wherein the organic nitrogen-containing compound is a compound represented by the formula:

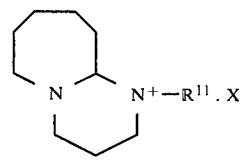

wherein $R^{11}$ is an alkyl group having 1 to 24 carbon atoms or an aralkyl group having 7 to 20 carbon atoms and X is a halide, hydroxylate, alkoxylate, carboxylate, phenoxide, sulfonate, sulfate, sulfite or carbonate anion.

8. The fluorinated rubber composition according to claim 7, wherein the fluorinated rubber is a copolymer of vinylidene fluoride and hexafluoropropene.

9. The fluorinated rubber composition according to claim 1, wherein the vulcanization accelerator is an organic phosphorus-containing compound.

10. The fluorinated rubber composition according to claim 9, wherein the organic phosphorus-containing compound is at least one member selected from the group consisting of (a) compounds having the formula:

wherein Y is P; $R^1$, $R^2$ and $R^3$ are each an alkyl group having 1 to 20 carbon atoms, or one of said $R^1$, $R^2$ and $R^3$ may be a cycloalkyl group having 3 to 20 carbon atoms, or two of said $R^1$, $R^2$ and $R^3$ may be linked together to form a nitrogen-containing ring; and (b) compounds having the formula:

$$(R^1)_3Y^+R^9.X^-$$

wherein Y is P and $R^1$ is an alkyl group having 1 to 20 carbon atoms, $R^9$ is an alkyl group having 1 to 20 carbon atoms or an aralkyl group having 7 to 20 carbon atoms.

11. The fluorinated rubber composition according to claim 1, wherein the proportion of the fluorinated rubber, the vulcanizing agent and the vulcanization accelerator is 100:0.5–10:0.1–10 by weight.

12. The fluorinated rubber composition according to claim 1 or claim 2, which further comprises an oxide or a hydroxide of a divalent metal.

* * * * *